(12) United States Patent
Locke et al.

(10) Patent No.: US 12,034,121 B2
(45) Date of Patent: Jul. 9, 2024

(54) BATTERY

(71) Applicant: GELION TECHNOLOGIES PTY LTD, Eveleigh (AU)

(72) Inventors: Jacob Locke, Abingdon (GB); Sebastien Liatard, Abingdon (GB); James Dibden, Abingdon (GB)

(73) Assignee: GELION TECHNOLOGIES PTY LTD, Eveleigh (AU)

( * ) Notice: Subject to any disclaimer, the term of this patent is extended or adjusted under 35 U.S.C. 154(b) by 450 days.

(21) Appl. No.: 17/275,582

(22) PCT Filed: Sep. 13, 2019

(86) PCT No.: PCT/GB2019/052585
§ 371 (c)(1),
(2) Date: Mar. 11, 2021

(87) PCT Pub. No.: WO2020/053604
PCT Pub. Date: Mar. 19, 2020

(65) Prior Publication Data
US 2022/0102758 A1   Mar. 31, 2022

(30) Foreign Application Priority Data
Sep. 14, 2018   (GB) ...................... 1815030

(51) Int. Cl.
*H01M 10/0568* (2010.01)
*H01M 4/38* (2006.01)
(Continued)

(52) U.S. Cl.
CPC ....... *H01M 10/0568* (2013.01); *H01M 4/382* (2013.01); *H01M 4/5815* (2013.01);
(Continued)

(58) Field of Classification Search
CPC .......... H01M 10/052; H01M 10/0525; H01M 10/054; H01M 10/0568; H01M 10/0569;
(Continued)

(56) References Cited

U.S. PATENT DOCUMENTS 10,916,803 B1 * 2/2021 Henslee ................ H01M 4/382
2010/0129724 A1   5/2010 Kolosnitsyn
(Continued)

FOREIGN PATENT DOCUMENTS

| CN | 106450102 A | 2/2017 |
|----|-------------|--------|
| CN | 106816633 A | 6/2017 |

(Continued)

OTHER PUBLICATIONS

Machine translation JP2016038958A (Year: 2016).*
(Continued)

*Primary Examiner* — Victoria H Lynch
(74) *Attorney, Agent, or Firm* — BakerHostetler (57) ABSTRACT

An electrochemical cell comprising:
an anode comprising lithium or sodium metal, or lithium or sodium metal alloy;
an ionically conductive cathode comprising an electroactive sulfur material; and
a liquid electrolyte comprising at least one lithium salt or at least one sodium salt, wherein the polysulfide solubility of the electrolyte is less than 500 mM.

17 Claims, 3 Drawing Sheets

(51) Int. Cl.
*H01M 4/58* (2010.01)
*H01M 4/62* (2006.01)
*H01M 10/0525* (2010.01)
*H01M 10/0569* (2010.01)
*H01M 4/02* (2006.01)

(52) U.S. Cl.
CPC ............ *H01M 4/623* (2013.01); *H01M 4/625* (2013.01); *H01M 10/0525* (2013.01); *H01M 10/0569* (2013.01); *H01M 2004/027* (2013.01); *H01M 2004/028* (2013.01); *H01M 2300/0025* (2013.01)

(58) Field of Classification Search
CPC ..... H01M 2004/027; H01M 2004/028; H01M 2300/0025; H01M 2300/0028; H01M 4/38; H01M 4/381; H01M 4/382; H01M 4/5815; H01M 4/62; H01M 4/622; H01M 4/623; H01M 4/624; H01M 4/625; Y02E 60/10
See application file for complete search history.

(56) References Cited

U.S. PATENT DOCUMENTS

| | | |
|---|---|---|
| 2014/0342249 A1 | 11/2014 | He et al. |
| 2015/0111104 A1 | 4/2015 | Engel et al. |
| 2016/0126589 A1 | 5/2016 | Xiao et al. |
| 2016/0172706 A1 | 6/2016 | Xiao et al. |
| 2017/0054180 A1 | 2/2017 | Fukushima et al. |
| 2018/0254524 A1 | 9/2018 | Zhang et al. |

FOREIGN PATENT DOCUMENTS

| | | | |
|---|---|---|---|
| CN | 107069093 A | 8/2017 | |
| JP | 2005243321 A | 9/2005 | |
| JP | 2011-521405 A | 7/2011 | |
| JP | 2015-216124 A | 12/2015 | |
| JP | 2016-38985 A | 3/2016 | |
| JP | 2016038985 A * | 3/2016 | .......... H01M 10/052 |
| WO | 9616450 A1 | 5/1996 | |
| WO | WO 2006/077380 A2 | 7/2006 | |

OTHER PUBLICATIONS

Ratnakumar Bugga, et al., "New Separators in Lithium/Sulfur Cells with High-Capacity Cathodes", A Journal of the Electrochemical Society, vol. 165, No. 1, Oct. 26, 2017, pp. A6021-A6028.
Y. Z. Zhang, et al., "Sulfur/polyacrylonitrile/carbon multi-composites as cathode materials for lithium/sulfur battery in the concentrated electrolyte", Journal of Materials Chemistry A, vol. 2, No. 13, Jan. 1, 2014, pp. 4652-4659.
International Search Report and Written Opinion of PCT/GB2019/052585 dated Mar. 19, 2020; 12 pages.
Great Britain Search Report for patent application No. GB 1815030.0 dated Mar. 7, 2019.
Patents Act 1977: Examination Report under Section 18(3) of Application No. GB1815030.0 dated Apr. 22, 2021.

* cited by examiner

BATTERY

The present invention relates to a cell, in particular a lithium-sulfur cell.

BACKGROUND

Secondary cells such as lithium-sulfur cells may be recharged by applying an external current to the cell. Rechargeable cells of this type have a wide range of potential applications. Important considerations when developing lithium-sulfur secondary cells include gravimetric and volumetric energy, cycle life and ease of cell assembly. Another example of a secondary cell is a sodium-sulfur cell.

A typical lithium-sulfur cell comprises an anode (negative electrode) formed from lithium metal or a lithium metal alloy, and a cathode (positive electrode) formed from elemental sulfur or other electroactive sulfur material. The sulfur or other electroactive sulfur-containing material may be mixed with an electrically conductive material, such as carbon, to improve its electrical conductivity.

Traditionally, high energy lithium-sulfur cells make use of a liquid electrolyte. The cathode commonly comprises carbon mixed with, or incorporating, sulfur. During discharge the electroactive sulfur material (e.g. elemental sulfur) is reduced to lithium polysulfide species $S_n^{2-}$ ($n \geq 2$, for example n=2 to 8)). These species are generally soluble within the electrolyte. In the second stage of discharge, the polysulfide species are reduced to lithium sulfide, $Li_2S$, which is insoluble. When the cell is charged, this two-stage mechanism occurs in reverse, with the lithium sulfide being oxidised to lithium polysulfide species and thereafter to sulfur. However, polysulfide shuttling resulting from the high solubility of polysulfides in the electrolyte can affect cycling performance and may reduce coulombic efficiency. In particular, during cycling of a traditional lithium-sulfur cell, the concentration of polysulfide species increases within traditional electrolyte formulations due to the high solubility of these species within the electrolyte. This process complicates the operation of traditional lithium-sulfur cells and results in a reduction in the available capacity (available useful energy), reduces cycle life and reduces the coulombic efficiency.

One alternative to traditional lithium-sulfur batteries are all-solid-state lithium-sulfur (ASSLiS) batteries. Instead of the liquid electrolyte found in a "traditional" lithium-sulfur cell, these comprise a solid electrolyte, for example a solid-state polymer or ceramic electrolyte. The use of a solid electrolyte can be advantageous in terms of safety and volumetric/gravimetric energy densities. The use of an all-solid-state battery avoids the formation of polysulfide species solvated within a liquid electrolyte, thus avoiding problems associated with the presence of these species. Thus, an all-solid-state lithium-sulfur battery is theoretically able to achieve high gravimetric and volumetric energies. However, ASSLiS batteries are subject to major issues such as poor interfacial contact between the electrolyte and electrodes.

In light of the above, there remains a need for a high energy lithium-sulfur cell that can address the above problems.

BRIEF DESCRIPTION OF FIGURES

Various aspects of the invention are described, by way of example, with reference to the accompanying figures, in which.

DESCRIPTION

Before particular examples of the present invention are described, it is to be understood that the present disclosure is not limited to the particular cells, methods or materials disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an" and "the" include plural forms unless the context clearly dictates otherwise. Thus, for example, "a cathode" includes reference to one or more of such elements.

According to one aspect of the present invention, there is provided an electrochemical cell comprising:
  an anode comprising lithium or sodium metal or lithium or sodium metal alloy;
  an ionically conductive cathode comprising an electroactive sulfur material; and
  a liquid electrolyte comprising at least one lithium salt or at least one sodium salt, wherein the polysulfide solubility of the electrolyte is less than 500 mM.

The cell in accordance with the present invention combines benefits associated with traditional lithium-sulfur cells and all-solid-state lithium-sulfur cells. Firstly, the use of a low porosity solid state cathode (i.e. a cathode structure having a low interfacial contact area between the electrolyte component and the cathode), with a redox active sulfur component which undergoes reduction and oxidation reactions without the formation of soluble intermediate polysulfide species, can result in a high energy lithium-sulfur cell. Secondly, the use of a liquid electrolyte with low solubility for lithium polysulfide species can ensure good interfacial contact between the electrolyte and each of the electrodes. The benefits derived from this type of hybrid liquid/solid state battery include high gravimetric and volumetric energy, high cycle life, improved safety characteristics, improved coulombic efficiency, and a beneficial voltage profile for BMS (battery management system) control.

In accordance with another aspect of the invention, there is provided an electrochemical cell comprising:
  an anode comprising lithium or sodium metal or lithium or sodium metal alloy;
  an ionically conductive cathode comprising an electroactive sulfur material; and
  a liquid electrolyte comprising at least one lithium salt or at least one sodium salt, wherein the concentration of the at least one lithium salt or sodium salt in the electrolyte is at least 75% of the saturation concentration of the electrolyte.

Electrochemical Cell

An electrochemical cell in accordance with the present invention may be a lithium-sulfur cell. A further example of an electrochemical cell in accordance with the invention is a sodium-sulfur cell. A lithium-sulfur cell may comprise a lithium anode, and a cathode comprising an electroactive sulfur material, for example, elemental sulfur. The electrolyte may comprise at least one solvent or ionic liquid and a salt, for example, a lithium salt. In another example, the electrochemical cell is a sodium-sulfur cell. Where the electrochemical cell is a sodium sulfur cell, the cell may comprise a sodium anode and a cathode comprising an electroactive sulfur material, for example elemental sulphur. The electrolyte may comprise at least one solvent or ionic liquid and a salt, for example a sodium salt.

Anode

In a lithium-sulfur cell, the lithium anode comprises an electroactive substrate comprising lithium. The electroactive substrate may comprise a lithium metal or lithium metal alloy. Preferably, the electroactive substrate comprises a foil formed of lithium metal or lithium metal alloy. Examples of lithium alloys include lithium aluminium alloy, lithium magnesium alloy and lithium boron alloy. Preferably, a lithium metal foil is used. Where the cell is a sodium-sulfur cell, the anode comprises a sodium metal or sodium metal alloy. Preferably, the anode comprises a foil formed of sodium metal or sodium metal alloy. Examples of sodium alloys include sodium aluminium alloy, sodium magnesium alloy and sodium boron alloy. Preferably, a sodium metal foil is used.

Cathode

The cathode of the electrochemical cell includes an electroactive sulfur material. The cathode is ionically conductive, i.e. it enables conduction of ions (i.e. alkali cations, $Li^+$ or $Na^+$) in the solid-state. Thus, the electrochemistry of the cell in accordance with the present invention is able to proceed with either little or no dissolution of active species such as polysulfides in the electrolyte. In one embodiment, 10% or less of the polysulfides formed during charge/discharge may dissolve in the electrolyte, preferably 5% or less, for example 2% of less. In one embodiment, no polysulfide is dissolved in the electrolyte. The chemistry involved in charge and discharge of the cell in accordance with the present invention is similar to that observed in an all-solid-state lithium-sulfur battery, in which polysulfides are not dissolved in the electrolyte.

The electroactive sulfur material may comprise elemental sulfur, sulfur-based organic compounds, sulfur-based inorganic compounds and sulfur-containing polymers. Preferably, elemental sulfur or $Li_2S$ is used. In one embodiment, the cathode comprises a sulfur-carbon composite. The cathode may comprise an electroactive sulfur material that may also be ionically conductive. This material may contain sulfur as well as additional elements such as Li, Na, Mg, P, N, Si, Ge, Ti, Zr, Sn, B, A, F, Cl, Br, I, O or any combination thereof. Examples of sulfur containing materials that are also ionically conductive include LGPS, $Li_3PS_4$ or $Li_7P_3S_{11}$. In one embodiment, the cathode may comprise a sulfur-carbon composite that is also ionically conductive.

The cathode may further comprise a solid electroconductive material. The solid electroconductive material may be any suitable conductive material. Preferably, this solid electroconductive material may be formed of carbon. Examples include carbon black, carbon fibre, graphene, reduced graphene oxide and carbon nanotubes. Other suitable materials include metal (e.g. flakes, filings and powders) and conductive polymers. Examples of conductive polymers include polypyrole, polythiophene, polyaniline, polyacetylene, polyphenylene vinylene and poly(3,4-ethylenedioxythiophene). Preferably, carbon black is employed. In one embodiment, where the cathode comprises a sulfur-carbon composite, a further solid electroconductive material may be absent from the cathode.

The cathode may further comprise an ionically conductive material, specifically a solid $Li^+$ or $Na^+$ ionic conductor. The ionically conductive material may have a bulk ionic conductivity of greater than $10^{-7}$ S/cm at 25° C., for example greater than $10^{-6}$ S/cm. Where the cathode contains an electroactive, ionically conductive material such as $Li_3PS_4$ or $Li_xP_yS_z$, a further ionically conductive material may be absent. In some examples, the lithium-ion conductive material comprises a ceramic material. The ceramic material may have a crystalline, polycrystalline, partially crystalline, or amorphous structure. Suitable ceramic materials include, but are not limited to, oxides, carbonates, nitrides, carbides, sulfides, oxysulfides, and/or oxynitrides of metals and/or metalloids. In some cases, the ceramic material comprises lithium. Non-limiting examples of suitable solid-state electrolytes of sufficient ionic conductivity may be produced by a combination of various lithium compounds, such as ceramic materials including lithium include lithium oxides (e.g., $Li_2O$, LiO, $LiO_2$, $LiRO_2$, where R is scandium, yttrium, lanthanum, cerium, praseodymium, neodymium, promethium, samarium, europium, gadolinium, terbium, dysprosium, holmium, erbium, thulium, ytterbium, and/or lutetium), lithium carbonate ($Li_2CO_3$), lithium nitrides (e.g., $Li_3N$), lithium oxysulfide, lithium oxynitride, lithium garnet-type oxides (e.g., $Li_7La_3Zr_2O_{12}$), $Li_{10}GeP_2S_{12}$, lithium phosphorus oxynitride, lithium silicosulfide, lithium germanosulfide, lithium lanthanum oxides, lithium titanium oxides, lithium borosulfide, lithium aluminosulfide, lithium phosphosulfide, lithium silicate, lithium borate, lithium aluminate, lithium phosphate, lithium halides, and combinations of the above. In certain cases, the ceramic material comprises a lithium oxide, a lithium nitride, or a lithium oxysulfide. In some embodiments, the ceramic includes a carbonate and/or a carbide.

In some embodiments, the lithium-ion-conductive material may be selected from species that can donate electron pairs (e.g., a Lewis base). Examples of suitable electron-donating materials include, but are not limited to, lithium oxides (e.g., $Li_2O$, LiO, $LiO_2$, $LiRO_2$, where R is scandium, yttrium, lanthanum, cerium, praseodymium, neodymium, promethium, samarium, europium, gadolinium, terbium, dysprosium, holmium, erbium, thulium, ytterbium, and/or lutetium), lithium carbonate ($Li_2CO_3$), lithium nitrides (e.g., $Li_3N$), lithium oxysulfide, lithium oxynitride, lithium garnet-type oxides (e.g., $Li_7La_3Zr_2O_{12}$), $Li_{10}GeP_2S_{12}$, lithium phosphorus oxynitride, lithium silicosulfide, lithium germanosulfide, lithium lanthanum oxides, lithium titanium oxides, lithium borosulfide, lithium aluminosulfide, lithium phosphosulfide, lithium silicate, lithium borate, lithium aluminate, lithium phosphate, lithium halides, and combinations of the above.

Examples of ceramic materials that can be used as the lithium-ion conductive material include: Li-containing oxides e.g. $Li_{3.3}La_{0.56}TiO_3$; Nasicon structure (eg: $LiTi(PO_4)_3$); LiSICON ($Li_{14}Zn(GeO_4)_4$); $Li_{10}GeP_2S_{12}$; Garnet: $Li_7La_3Zr_2O_{12}$; $Li_2O$; other oxides e.g. Al2O3, TiO2, ZrO2 SiO2, ZnO; sulfides e.g. $Li_2S$—$P_2S_5$; antiperovskites e.g. $Li_3OCl$; hydrides e.g. $LiBH_4$, (X=Cl, Br, I), LiNH, $LiNH_2$, $Li_3AlH_6$, $Li_2NH$; borates or phosphates e.g. $Li_2B_4O_7$, $Li_3PO_4$, LiPON; carbonates or hydroxides e.g. $Li_2CO_3$, LiOH; fluorides, e.g. LiF; nitrides e.g. $Li_3N$; sulfides e.g. lithium borosulfides, lithium phosphosulfides, lithium aluminosulfides, oxysulfides, praseodymium oxide. At least one of said ceramic materials may be used, or combinations thereof. In a sodium sulfur cell, the sodium ion equivalent of any of these conductive materials may be utilised.

In some examples, the lithium-ion conductive material may be formed of a polymeric material which is inherently ionically conductive, e.g. Nafion. Alternatively, polymers blended with lithium (or sodium) salts, which can achieve bulk conductivities of greater than $10^{-7}$ S/cm, may also be used. Examples of suitable polymers include EO based polymers (for example PEO); acrylate based polymer (for example PMMA); polyamines (polyethyleneimine); siloxanes (poly(dimethylsiloxane)); polyheteroaromatic compounds (e.g., polybenzimidazole); polyamides (e.g. Nylons), polyimides (e.g. Kapton); polyvinyls (e.g. polyacrylamide, poly(2-vinyl pyridine), poly(N-vinylpyrrolidone), poly(methylcyanoacrylate), poly(vinyl acetate), poly (vinyl alcohol), poly(vinyl chloride), poly(vinyl fluoride); inorganic polymers (e.g. polysilane, polysilazane. polyphosphazene, polyphosphonate); polyurethanes; polyolefins (e.g. polypropylene, polytetrafluoroethylene); polyesters (e.g. polycarbonate, polybutylene terephthalate). In one embodiment, co-block polymers such as Nafion may be used. At least one of said polymeric materials may be used, or combinations thereof. In one embodiment, the cathode contains ceramic particles in combination with one or more ionically conductive polymers In the cathode, both electrons and ions can be conducted in the solid state. This allows the electrochemical reactions at the cathode during charge or discharge to occur in solid-state, without the need to form soluble intermediates in the form of polysulfide species.

The cathode may additionally include a binder for binding the cathode components together. The cathode may also bind the cathode components to an electronically conductive current collector. In doing so, the binder can provide improved mechanical robustness to the cathode, or can improve the processability of the cathode. The binder may be a polymeric binder, for example a polyether, such as poly(ethylene oxide)s, polyethylene glycols, polypropylene glycols, polytetramethylene glycols (PTMGs), polytetramethylene ether glycols (PTMEGs).

The binder may be selected from halogenated polymers and more preferably still from fluorinated polymers. Examples of suitable binders include poly(vinylidene fluoride) (PVDF), preferably in the a form, poly(trifluoroethylene) (PVF3), polytetrafluoroethylene (PTFE), copolymers of vinylidene fluoride with either hexafluoropropylene (HFP) or trifluoroethylene (VF3) or tetrafluoroethylene (TFE) or chlorotrifluoroethylene (CTFE), fluoroethylene/propylene (FEP) copolymers, copolymers of ethylene with either fluoroethylene/propylene (FEP) or tetrafluoroethylene (TFE) or chlorotrifluoroethylene (CTFE), perfluoropropyl vinyl ether (PPVE), perfluoroethyl vinyl ether (PEVE) and copolymers of ethylene with perfluoromethyl vinyl ether (PMVE) or blends thereof.

Other examples of suitable binders include polyacrylonitrile, polyurethane, PVDF-acrylic co-polymer; polyacrylic acid, polyimides and polyvinyl alcohol. Further suitable binders include rubber (e.g. styrene butadiene rubber), cellulose (e.g. carboxymethyl cellulose) or gelatine.

In some examples, the binder is selected from at least one of PEO, PVDF, Nafion, polypyrole, polythiophene, polyaniline, polyacetylene, polyphenylene vinylene, poly(3,4-ethylenedioxythiophene) and polyphenylene sulphide. For example, the binder may comprise a polyethylene oxide, or PVDF.

The cathode may comprise 0.05 to 20 weight % binder based on the total weight of the cathode, preferably 0.5 to 10 weight %, for example 1 to 5 weight %, for example 2 to 3 wt %.

Electrolyte

The electrolyte in accordance with the present invention may be a liquid electrolyte. The liquid electrolyte provides good physical contact between the electrolyte and the electrode, as a result of the electrolyte wetting the cathode and the anode. This is in contrast to an all-solid-state battery, where the solid electrolyte is unable to provide satisfactory interfacial contact between the electrolyte and the anode/cathode due to the absence of wetting. This is a particular problem during cycling of an ASSLiS cell when, during cycling, volume changes occur in the anode and cathode due to the reactions occurring during charge or discharge. As a result of these volume changes, maintaining intimate contact at the anode-electrolyte and cathode-electrolyte interfaces is extremely challenging.

Any suitable solvent system or liquid or gel or mixture of liquids and/or gels may be used for the electrolyte. The electrolyte is liquid across the range of operating temperatures of the cell, which may be from −30 to 120° C., preferably from −10 to 90° C., for example from 0 to 60° C. Operating pressures of the cell may be from 5 mbar to 100 bar, preferably from 10 mbar to to 50 bar, for example 100 mbar to 20 bar. In one example, the cell may be operated at room temperature and pressure. The high concentration of the electrolyte in accordance with the present invention means that the electrolyte has a lower vapour pressure than a standard electrolyte. Thus, the cell in accordance with the present invention may perform better than a standard lithium-sulfur at a low pressure. The liquid electrolyte may be a gel electrolyte.

Suitable organic solvents for use in the electrolyte are ethers (e.g. linear ethers, diethyl ether (DEE), diglyme (2-methoxyethyl ether), tetraglyme, tetrahydrofuran, 2-methyltetrahydrofuran, dimethoxyethane (DME), dioxolane (DIOX)); carbonates (e.g. dimethylcarbonate, diethylcarbonate, ethylmethylcarbonate, methylpropylcarbonate, ethylene carbonate (EC), propylene carbonate (PC); sulfones (e.g. dimethyl sulfone (DMS), ethyl methyl sulfone (EMS), tetramethyl sulfone (TMS)); esters (e.g. methyl formate, ethyl formate, methyl propionate, methylpropylpropionate, ethylpropylpropionate, ethyl acetate and methyl butyrate); ketones (e.g. methyl ethyl ketone); nitriles (e.g. acetonitrile, proprionitrile, isobutyronitrile); amides (e.g. dimethylformamide, dimethylacetamide, hexamethyl phosphoamide, N, N, N, N-tetraethyl sulfamide); lactams/lactones (e.g. N-methyl-2-pyrrolidone, butyrolactone); ureas (e.g. tetramethylurea); sulfoxides (e.g. dimethyl sulfoxide); phosphates (e.g. trimethyl phosphate, triethyl phosphate, tributyl phosphate); phosphoramides (e.g. hexamethylphosphoramide). Further suitable solvents include toluene, benzene, heptane, xylene, dichloromethane, and pyridine.

Any of the ethers, carbonates, sulfones, esters, ketones, nitriles, amides, lactams, ureas, phosphates, phosphoramides may be fluorinated. An example of a fluorinated ether is 1,1,2,2,-tetrafluoroethyl-2,2,3,3-tetrafluoropropyl ether.

Any combination of one or more of the above solvents may be included in the electrolyte.

In an alternative embodiment, the electrolyte may comprise one or more ionic liquids as solvent. Said ionic liquids may comprise salts comprising organic cations such as imidazolium, ammonium, pyrrolidinium, and/or organic anions such as bis(trifluoromethanesulfonyl)imide bis(fluorosulfonyl)imide FSI⁻, triflate, tetrafluoroborate $BF_4^-$, dicyanamide DCA⁻, chloride Cl⁻. The ionic liquid is liquid at room temperature (20° C.). Examples of suitable ionic liquids include (N,N-diethyl-N-methyl-N(2methoxyethyl) ammonium bis(trifluoromethanesulfonyl), N,N-Diethyl-N-methyl-N-propylammonium bis(fluorosulfonyl)imide, N,N-Diethyl-N-methyl-N-propylammonium bis(fluorosulfonyl) imide, N,N-dimethyl-N-ethyl-N-(3-methoxypropyl) ammonium bis(fluorosulfonyl)imide, N,N-dimethyl-N-ethyl-N-(3-methoxypropyl)ammonium bis (trifluoromethanesulfonyl)imide, N,N-Dimethyl-N-ethyl-N-benzylAmmonium bis(trifluoromethanesulfonyl)imide, N,N-Dimethyl-N-Ethyl-N-Phenylethylammonium bis(trifluoromethanesulfonyl)imide, N-Ethyl-N,N-dimethyl-N-(2-methoxyethyl)ammonium bis(fluorosulfonyl)imide, N-Ethyl-N,N-dimethyl-N-(2-methoxyethyl)ammonium bis (trifluoromethanesulfonyl)imide, N-Tributyl-N-methylammonium bis(trifluoromethanesulfonyl)imide, N-Tributyl-N-methylammonium dicyanamide, N-Tributyl-N-methylammonium iodide, N-Trimethyl-N-butylammonium bis(trifluoromethanesulfonyl)imide, N-Trimethyl-N-butylammonium bromide, N-Trimethyl-N-hexylammonium bis (trifluoromethanesulfonyl)imide, N-Trimethyl-N-propylammonium bis(fluorosulfonyl)imide, N-Trimethyl-N-propylammonium bis(trifluoromethanesulfonyl)imide, (N,N-diethyl-N-methyl-N(2methoxyethyl)ammonium bis (fluorosulfonyl)imide, 1-Butyl-1-methylpyrrolidinium bis (fluorosulfonyl)imide, 1-Ethyl-3-methylimidazolium bis (fluorosulfonyl)imide, 1-Methyl-1-(2-methoxyethyl) pyrrolidinium bis(fluorosulfonyl)imide, N,N-Diethyl-N-methyl-N-propylammonium bis(fluorosulfonyl)imide, N-Ethyl-N,N-dimethyl-N-(2-methoxyethyl)ammonium bis (fluorosulfonyl)imide, N-propyl-N-methylpiperidinium bis (fluorosulfonyl)imide, N-Trimethyl-N-butylammonium bis (fluorosulfonyl)imide, N-methyl-N-butyl-piperidinium bis (trifluoromethanesulfonyl) imide, N-methyl-N-propylpyrrolidinium bis(trifluoromethanesulfonyl)imide and combinations thereof.

Alternatively or additionally, the liquid electrolyte may be a gel electrolyte. The gel electrolyte may comprise polyethylene oxide with a gelling liquid electrolyte, for example an ether such as dimethyl ether. In one example, the electrolyte may comprise polyethylene oxide in combination with LiTFSI in dimethylether.

Any combination of the above solvents may be employed in the electrolyte. For example, the electrolyte may comprise the combination of an ionic liquid with a fluorinated ether, or the combination of an ionic liquid within a gel, or the combination of a fluorinated ether within a gel. Any other combination of two or more of the liquids and/or gels detailed above may be envisaged.

In a preferred embodiment the solvent is an ether, for example dimethoxyethane (DME), dioxolane (DIOX), diglyme, triglyme, tetraglyme or a mixture thereof. In another preferred embodiment the solvent is a fluorinated ether.

Where the cell is a lithium-sulfur cell, the electrolyte comprises a lithium salt dissolved in the solvent. Suitable lithium salts include lithium hexafluoroarsenate $LiAsF_6$, lithium hexafluorophosphate $LiPF_6$, lithium perchlorate $LiCLO_4$, lithium sulfate $Li_2SO_4$, lithium nitrate $LiNO_3$, lithium trifluoromethanesulfonate LiOTf, lithium bis(trifluoromethane)sulfonimide LiTFSI, lithium bis(fluorosufonyl)imide LiFSI, lithium bis(oxalate)borate LiBOB, lithium difluoro(oxalate)borate LiDFOB, lithium bis(pentafluoroethanesulfonyl)imide LiBETI, lithium 2-trifluoromethyl-4,5-dicyanoimidazole LiTDI and combinations thereof.

The electrolyte may comprise one or more lithium salt. Combinations of salts may be employed, for example lithium triflate may be used in combination with lithium nitrate.

Alternatively, where the cell is a sodium-sulfur cell, the electrolyte comprises at least one sodium salt dissolved in the organic solvent. Suitable sodium salts include sodium hexafluoroarsenate, sodium hexafluorophosphate, sodium perchlorate, sodium sulfate, sodium nitrate, sodium trifluoromethanesulfonate, sodium bis(trifluoromethane)sulfonimide, sodium bis(fluorosufonyl)imide, sodium bis(oxalate) borate, sodium difluoro(oxalate)borate, sodium bis (pentafluoroethanesulfonyl)imide, sodium 2-trifluoromethyl-4,5-dicyanoimidazole and combinations thereof. The electrolyte may comprise one or more of said sodium salts. In one embodiment, the electrolyte may comprise a combination of lithium and sodium salts.

The electrolyte has a low solubility for polysulfides, or in some cases the electrolyte may not dissolve polysulfides. The electrolyte may have a polysulfide solubility of less than 500 mM at room temperature (20° C.). For example, the electrolyte may have a polysulfide solubility of less than 400 mM, preferably less than 200 mM, more preferably less than 100 mM, for example less than 50 mM, for example less than 1 mM at room temperature. Correspondingly, the electrolyte may have a low solubility for sulfur-containing species (such as polysulfides and sulfur) in general. For example, the electrolyte may have a sulfur solubility of less than 500 mM at room temperature (20° C.). For example, the electrolyte may have a polysulfide solubility of less than 400 mM, preferably less than 200 mM, more preferably less than 100 mM, for example less than 50 mM, for example less than 1 mM at room temperature.

The lithium or sodium salt may be present in the electrolyte at a high concentration, i.e. at a level close to the saturation concentration of the electrolyte. For example, the concentration of lithium or sodium salt or salts in the electrolyte may be within the range of 0.05 M to 10 M, preferably, 1 M to 5 M, for example, 3 M. The concentration of the at least one lithium or sodium salt in the solvent may be at least 75% of the saturation concentration of the solvent system, preferably at least 80% of the saturation concentration of the solvent, for example at least 85% of the saturation concentration of the solvent, for example at least 90% of the saturation concentration of the solvent. In one example, the concentration of the solvent is about 100% of the saturation concentration, i.e. the electrolyte may be fully saturated.

The term "saturation concentration" is the extent of solubility of a particular substance in a specific solvent. When the saturation concentration is reached, adding more solute (for example, more lithium salt) does not increase the concentration of the solution. Instead, the excess solute precipitates out of solution. The saturation concentration is determined at room temperature, for example at 25° C.

The use of an electrolyte having poor or no solubility of polysulfides, for example the use of an electrolyte containing lithium salts at a concentration close to saturation concentration, can inhibit polysulfide shuttle within an electrolyte, and is therefore beneficial in cells such as lithium-sulfur cells. The polysulfide shuttle effect is undesirable due to the resultant loss of coulombic efficiency. Without wishing to be bound by theory, a high concentration of the electrolyte, and the presence of lithium (or sodium) salts at a concentration close to saturation concentration, allows only a small amount of polysulfides to dissolve in the electrolyte, which means that little or no polysulfide shuttling is able to occur. Thus, the concentration of alkali metal salts within the electrolyte means that the electrolyte has a low solubility for polysulfides. The use of electrolytes containing lithium salts at a concentration close to saturation concentration in a "traditional" lithium-sulfur cell tends to result in a poor electrochemical performance due to low utilisation of the active sulfur species. This would result from the inability of the intermediate species to be solvated by the electrolyte, as the electrolyte is close to solvation. Without the solvation of intermediate species within a traditional cathode, there is insufficient lithium ion transport to the active sulfur species present, and therefore this would result in significantly reduced utilisation and performance at usual operating conditions. However, the combination of a low porosity, solid state cathode with an electrolyte with poor polysulfide solubility mitigates this issue because of the lack of polysulfide dissolution during cycling. In the present invention, an electrolyte with poor polysulfide solubility, for example an electrolyte containing salts at a concentration close to the saturation concentration of the electrolyte, may be efficiently used in combination with a solid-state cathode. While, in a traditional high energy lithium sulfur battery, the cathode requires a non-viscous electrolyte with a concentration that is far from the saturation concentration of the electrolyte, the chemistry involved in cells of the present invention means that there is no necessity for the electrolyte to be non-viscous, and no necessity for the concentration of the electrolyte to be far from the saturation concentration of dissolved lithium salts (or sodium salts, in the case of a sodium sulfur cell).

The use of the combination of electrolyte and cathode in accordance with the present invention allows for low volumes of electrolyte to be employed in a cell, despite the low solubility of polysulfides within the electrolyte system. In a traditional lithium-sulfur cell, an electrolyte with a high solubility for lithium polysulfide species is required, and the capacity of such a cell is dependent on the solubility, and therefore the electrolyte volume available within the cell. Highly concentrated electrolytes have a low solubility for polysulfide intermediates. Thus, if a highly concentrated electrolyte is used in combination with a traditional cathode, much more electrolyte is required to achieve a high capacity, as much more electrolyte is required to solubilise the active material. A larger volume of electrolyte is disadvantageous as it would increase the size and weight of the cell and would result in a low specific energy.

In the present invention, the chemistry occurring in the cathode means that the formation of polysulfides is inhibited or avoided, and therefore the cell is not dependent upon the solubility and volume of the electrolyte on the achievable capacity during charge and discharge. This allows a relatively small amount of high concentrated electrolyte to be used in order to obtain a high capacity. In one embodiment, about 0.1 to 3 microliters of electrolyte per gram of active sulfur is present in a cell in accordance with the present invention, preferably 0.5 to 2 microliters of electrolyte per gram of active sulfur, for example 1 microliter of electrolyte per gram of active sulfur.

The use of a highly concentrated electrolyte can also increase the performance of the lithium metal anode. For example, the highly concentrated electrolyte can effectively passivate the anode, forming a stable solid-electrolyte interface (SEI). This can enable safe cycling of the cell and can provide a long cycle life.

The electrolyte may also contain additional salts in addition to the above-detailed lithium (or sodium) salts. For example, the electrolyte may comprise further metal salts, such as sodium, lithium, potassium, rubidium, cesium, calcium, magnesium salts. Examples of additional salts include NaTFSI, KTFSI, RbTFSI, CsTFSI, Ca(TFSI)$_2$, Mg(TFSI)$_2$ NaPF$_6$ NaFSI. The additional salts may be present in an amount of from 1 to 50 wt % of the total amount of salt within the electrolyte, preferably from 5 to 30 wt %, for example 10 to 20 wt %.

Method

The cell in accordance with the present invention may be produced by any suitable method. For example, a mixture of electroactive sulfur material may be mixed with applied to a current collector in the form of a slurry in a solvent (e.g. water or an organic solvent). The electroactive sulfur material may be mixed with, for example, an ionically conductive material and/or an electroconductive material and further optional components such as binders prior to forming the slurry. The solvent may then be removed and the resulting structure calendared to form a composite structure, which may be cut into the desired shape to form a cathode. A separator may then be placed on the cathode and an anode placed on the separator, forming a stack, followed by addition of the electrolyte to form the cell.

EXAMPLES

Example 1

The electrochemical performance of a lithium sulfur cell with a "traditional" cathode is provided. The cathode (positive electrode) comprised 70 wt. % sulfur as active material, 20 wt. % Ketjen Black as a conductive additive and 10 wt. % PEO as a binder. The liquid electrolyte of the cell contained a lithium salt at a concentration above 75% of its saturation concentration. Said liquid electrolyte consisted of LiFSI dissolved within Dimethoxyethane (DME) to a molar concentration of 4.5 M. Lithium metal foil 100 micron thick was utilised as the negative electrode (anode). The liquid electrolyte component was held within an inert separator placed between the electrodes.

The cell was cycled between 1.5 and 2.8V under an applied current equivalent to a rate of C/50 based upon the total sulfur content of the cathode, measured by mass, and assuming the theoretical capacity of sulfur to be 1672 mA h g$^{-1}$.

Figure 1:
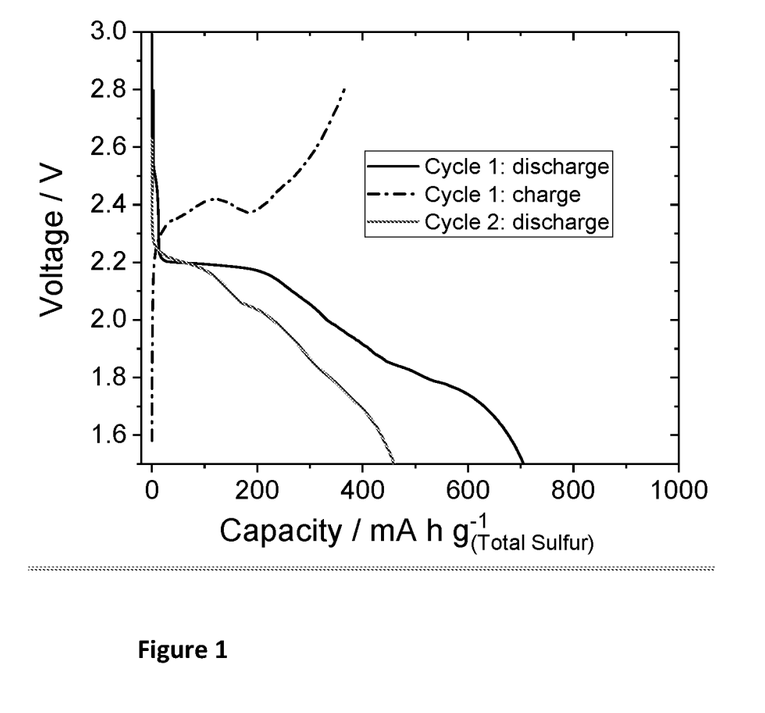
FIG. 1 shows electrochemical performance data of a cell containing a traditional sulfur cathode, a liquid electrolyte containing a lithium salt at a concentration above 75% of its saturation concentration and a lithium metal foil anode.

Electrochemical performance data of the cell is provided in FIG. 1.

The use of the electrolyte which is at >75% of its saturation concentration allows for restriction of the formation of polysulfide species. This reduces or prevents the shuttle phenomenon. However, the utilisation of the active material is poor.

Example 2

Figure 2:
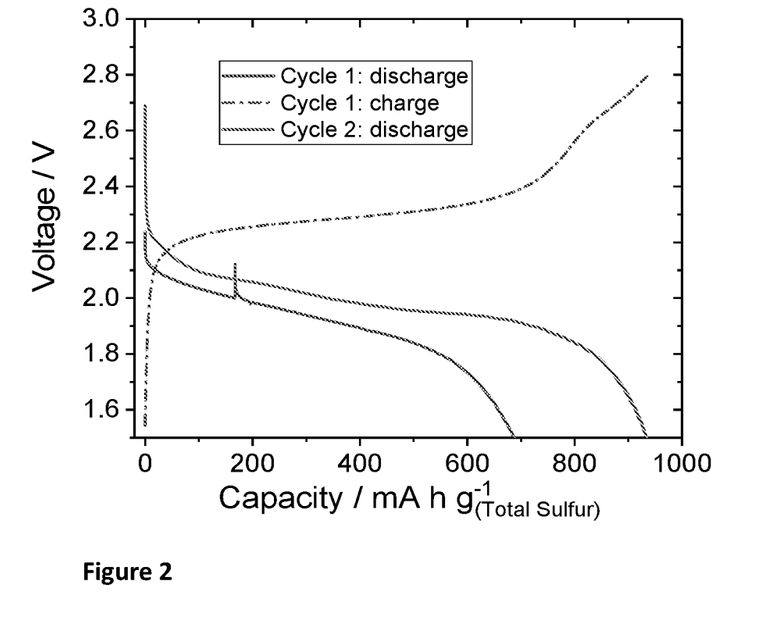
FIG. 2 shows electrochemical performance data of a cell in accordance with the present invention.

Electrochemical performance data for a cell in accordance with the present invention is provided in FIG. 2. The cathode (positive electrode) produced as per invention comprised 50 wt. % solid ionically conducting ceramic (produced by combining 75 wt. % Li$_2$S with 25 wt. % P$_2$S$_5$), 30 wt. % elemental sulfur as active material, and 10 wt. % Ketjen Black as a electronically conductive additive. A liquid electrolyte containing a lithium salt at a concentration above 75% of its saturation concentration and a lithium metal foil anode (negative electrode). The liquid electrolyte component was held within an inert separator placed between the electrodes. Sulfur contained within the solid electrolyte component is accounted for within the capacity calculation.

Figure 3:
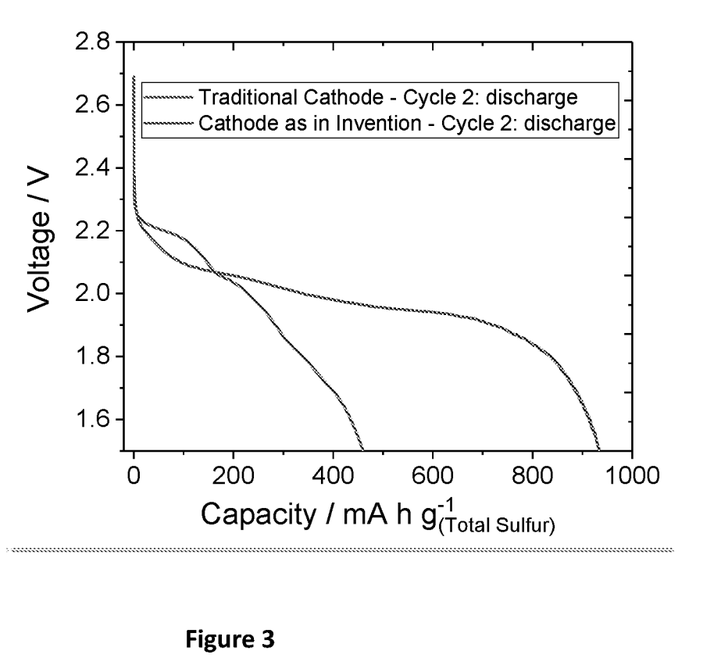
FIG. 3 shows a comparison of the cycle 2 discharge profiles from the electrochemical performance data in FIGS. 1 and 2.

Within this cell the utilisation of the active sulfur material is significantly enhanced and the formation of soluble polysulfide species is restricted, no shuttle is observed. A comparison of the cycle 2 discharge profiles from FIGS. 1 and 2 is provided in FIG. 3. This comparison shows that the use of a cathode (positive electrode) as described in the invention in combination with an electrolyte at >75% of its saturation concentration allows for a significant gain in performance compared to the traditional type of sulfur cathode. The invention allows for high utilisation of the active material whilst avoiding formation of solvated polysulfide species and therefore no shuttle phenomenon is observed.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An electrochemical cell comprising:
   an anode comprising lithium or sodium metal, or lithium or sodium metal alloy;
   an ionically conductive cathode comprising an electroactive sulfur material and an ionically conductive material with a bulk ionic conductivity of greater than $10^{-7}$ S/cm at 25° C.; and
   a liquid electrolyte comprising at least one lithium salt or at least one sodium salt, wherein the polysulfide solubility of the liquid electrolyte is less than 500 mM of sulfur at 25° C.

2. The cell of claim 1, wherein the liquid electrolyte is at least 75% saturated when measured at 25° C.

3. The cell of claim 1, wherein the ionically conductive material is selected from at least one of conducting ceramic particles or an ionically conducting polymer.

4. The cell of claim 3, wherein the conducting ceramic particles are selected from at least one of LLZO, LATP, LGPS or $Li_2S$—$P_2S_5$.

5. The cell of any preceding claim, wherein the cathode further comprises a solid electroconductive material comprising an electroconductive carbon material or an electroconductive polymer.

6. The cell of claim 5, wherein the electroconductive carbon material is selected from at least one of carbon nanotubes, carbon nanofibers, graphene, reduced graphene oxide or carbon black.

7. The cell of claim 5, wherein the electroconductive polymer is selected from at least one of polypyrrole, polythiophene, polyaniline, polyacetylene, polyphenylene vinylene or poly(3,4-ethylenedioxythiophene).

8. The cell of claim 1, wherein the cathode comprises a carbon-sulfur composite material.

9. The cell of any preceding claim, wherein the cathode contains from 1 to 60% by weight ionically conductive material based on the total weight of the cathode.

10. The cell of any preceding claim wherein the electroactive sulfur material comprises elemental sulfur or $Li_2S$.

11. The cell of any preceding claim wherein the at least one lithium salt is selected from lithium hexafluoroarsenate $LiAsF_6$, lithium hexafluorophosphate $LiPF_6$, lithium perchlorate $LiClO_4$, lithium sulfate $Li_2SO_4$, lithium nitrate $LiNO_3$, lithium trifluoromethanesulfonate LiOTf, lithium bis(trifluoromethane)sulfonimide LiTF SI, lithium bis(fluorosufonyl)imide LiF SI, lithium bis(oxalate)borate LiBOB, lithium difluoro(oxalate)borate LiDFOB, lithium bis(pentafluoroethanesulfonyl)imide LiBETI, lithium 2-trifluoromethyl-4,5-dicyanoimidazole LiTDI and combinations thereof.

12. The cell of any preceding claim wherein the electrolyte comprises a solvent selected from at least one of linear ethers, diethyl ether (DEE), tetrahydrofuran (THF), Dimethoxyethane (DME), Dioxolane (DIOX), Diglyme, dimethyl carbonate(DMC), ethyl methyl carbonate (EMC), ethylene carbonate (EC), propylene carbonate (PC), methyl formate (MF), ethyl formate (EF), methyl propionate (MP), ethyl acetate (EA) and methyl butyrate (MB), methyl ethyl ketone, acetonitrile (ACN), propionitrile (PN), isobutyronitrile (iBN), Dimethylformamide (DMF), Dimethylacetamide (DMAc), N-Methyl-2-pyrrolidone (NMP), Tetramethylurea (TMU), Dimethyl sulfoxide (DMSO), Trimethyl phosphate, Triethyl phosphate, Hexamethylphosphoramide, Toluene, Benzene, Heptane, Xylene or Dichloromethane; ionic liquids, fluorinated ethers, gels, and mixtures thereof.

13. The cell of any preceding claim wherein the liquid electrolyte is at least 80% saturated.

14. The cell of any preceding claim wherein the cathode further comprises a binder wherein the binder is selected from at least one of PEO, PVDF, polypyrole, polythiophene, polyaniline, polyacetylene, polyphenylene vinylene, poly(3, 4-ethylenedioxythiophene) or polyphenylene sulphide.

15. The cell of claim 14 wherein the binder comprises 1 to 30% by weight of the total weight of the cathode.

16. The cell of any preceding claim, wherein the polysulfide solubility of the liquid electrolyte is less than 400 mM.

17. The cell of any preceding claim wherein the cell is a lithium-sulfur cell.

* * * * *